(12) United States Patent
Cantral (10) Patent No.: US 7,751,624 B2
(45) Date of Patent: Jul. 6, 2010

(54) SYSTEM AND METHOD FOR AUTOMATING DOCUMENT SEARCH AND REPORT GENERATION

(75) Inventor: Donald J. Cantral, Orange, CA (US)

(73) Assignee: Nextace Corporation, Orange, CA (US)

( * ) Notice: Subject to any disclaimer, the term of this patent is extended or adjusted under 35 U.S.C. 154(b) by 1010 days.

(21) Appl. No.: 11/208,050

(22) Filed: Aug. 19, 2005

(65) Prior Publication Data

US 2006/0039610 A1 Feb. 23, 2006

Related U.S. Application Data

(60) Provisional application No. 60/602,719, filed on Aug. 19, 2004.

(51) Int. Cl.
*G06K 9/46* (2006.01)
(52) U.S. Cl. ......... 382/190; 382/305; 358/403
(58) Field of Classification Search ......... 382/190, 382/118, 305; 705/40; 358/434, 402, 1.15, 358/403
See application file for complete search history.

(56) References Cited

U.S. PATENT DOCUMENTS

| | | | | | |
|---|---|---|---|---|---|
| 3,670,310 | A | * | 6/1972 | Bharwani et al. | 1/1 |
| 4,410,278 | A | * | 10/1983 | Makihira et al. | 356/445 |
| 5,091,790 | A | * | 2/1992 | Silverberg | 358/434 |
| 5,461,488 | A | * | 10/1995 | Witek | 358/402 |
| 6,950,553 | B1 | * | 9/2005 | Deere | 382/218 |
| 7,106,887 | B2 | * | 9/2006 | Kinjo | 382/118 |
| 7,375,835 | B1 | * | 5/2008 | Hull et al. | 358/1.15 |
| 2003/0007192 | A1 | * | 1/2003 | Kuranaga | 358/462 |
| 2003/0194136 | A1 | * | 10/2003 | Fujii et al. | 382/209 |
| 2003/0215137 | A1 | * | 11/2003 | Wnek | 382/181 |
| 2004/0088172 | A1 | * | 5/2004 | Baglioni | 705/1 |
| 2004/0117358 | A1 | * | 6/2004 | von Kaenel et al. | 707/3 |
| 2006/0020541 | A1 | * | 1/2006 | Gommlich | 705/40 |
| 2006/0039610 | A1 | * | 2/2006 | Cantral | 382/190 |

* cited by examiner

*Primary Examiner*—Daniel G Mariam
*Assistant Examiner*—Aklilu k Woldemariam
(74) *Attorney, Agent, or Firm*—Klein, O'Neill & Singh, LLP (57) ABSTRACT

A method for processing a customer request comprises receiving a request, sending the requests to a data provider; receiving a document image from the data provider, performing pattern data extraction on the document image, and preparing a customized report. Additionally, a system for processing customer requests comprises a receiving module for receiving customer requests, a data acquisition module for receiving data from plural sources, an image distribution module for distributing data to appropriate entities, a pattern data extraction module for performing pattern detection and extraction, and a data output module for formatting data.

17 Claims, 8 Drawing Sheets

FIGURE 5A(iii)

SYSTEM AND METHOD FOR AUTOMATING DOCUMENT SEARCH AND REPORT GENERATION

CROSS-REFERENCE TO RELATED APPLICATION

This application claims the benefit, under 35 U.S.C. §119 (e), of co-pending provisional application No. 60/602,717, filed Aug. 19, 2004, the disclosure of which is incorporated herein by reference.

FEDERALLY SPONSORED RESEARCH OR DEVELOPMENT

Not Applicable

BACKGROUND OF THE INVENTION

The present invention relates to computing systems, and more particularly to a system and method for efficiently processing digital documents.

Document search and compilation is needed in various business and personal matters. For example, when one purchases a house the transaction is conducted via an escrow company. A mortgage company, before releasing funds to complete the house sale, requires that the title to the property is valid and clear from any liability. Hence a title insurance company often conducts or orders a title search for the property. Often a search company collects documents from various disparate sources and compiles the information to prepare a search report. Some of these sources (or data providers) provide data and/or images electronically to facilitate automated results. Similar searches are performed in other business, legal, and other situations. For example, similar searches may be performed for due diligence in mergers and acquisitions; and employment background checks.

Conventional search systems continue to use manual labor and inefficient archaic systems and methodologies. A fully integrated/automated system that receives a customer request and efficiently delivers a customized report (or product) is commercially unavailable.

Automation today provides the ability to access enormous databases with millions of records on a wide variety of subjects. Automation also provides millions of documents and images containing a vast array and amount of information. Information stored in these documents and images includes names, addresses, historical data, financial data, property data, and other items that cannot be isolated or extracted using an automated process. This extraction process is performed manually and individually. The process is both cumbersome and cost prohibitive. Examples of documents subjected to this process include, property records, legal records, resumes, and other documents.

Title insurance, escrow, legal, and other companies currently spend millions of dollars and countless man hours each year isolating and extracting data elements from existing digital documents for further data processing or inclusion in other documents (for example, title search reports).

Optical Character Recognition ("OCR") is an existing technology that converts document images into a text format allowing the document to be saved and viewed as a digital document. Information from documents that have undergone the OCR process (OCRed) may be extracted and used in other processes. Although OCR recognizes individual characters and can combine those into meaningful text, it does not allow or provide for automated extraction of data elements from digital documents.

Therefore, there is a need for a system and method that can efficiently extract useful information from digital documents based on customer needs and requirements.

SUMMARY OF THE INVENTION

In one aspect of the present invention, a method for processing a customer request comprises receiving a request; sending the requests to a data provider; receiving a document image from the data provider; performing pattern data extraction on the document image; and delivering a customized report based on pattern data extraction.

In another aspect of the present invention, a system for processing customer requests comprises a receiving module for receiving customer requests; a data acquisition module for receiving data from plural sources; an image distribution module for distributing data to appropriate entities; a pattern data extraction module for performing pattern detection and extraction; and a data output module for formatting data.

In yet another aspect of the present invention, a method for pattern data extraction comprises receiving document source data from a data provider; converting the document source data into text; identifying the document as a specific document type; identifying a rule set for the specific document type; identifying whether a pattern exists in the document; cycling through the appropriate rule set according to the relevance of each pattern identified in the document; parsing the document data to build new words and phrases according to the rule set; and identifying a data component type and pattern results set according to the rule set.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a computing system will initially be described. The specific architecture and operation of the preferred embodiment will then be described with reference to the general architecture.

Figure 1:
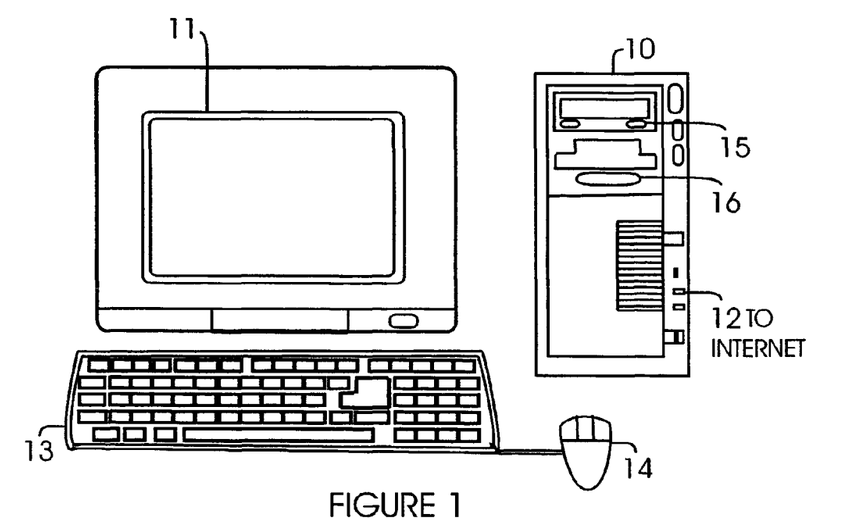
FIG. 1 is a block diagram of a computing system that may be used to execute computer executable process steps according to one aspect of the present invention.

FIG. 1 is a block diagram of a computing system for executing computer executable process steps according to one aspect of the present invention. FIG. 1 includes a host computer 10 and a monitor 11. Monitor 11 may be a cathode ray tube (CRT) type, a flat panel type, or any other type of color or monochrome display. Also provided with computer 10 are a keyboard 13 for entering data and user commands, and a pointing device 14 for processing objects displayed on monitor 11.

Computer 10 includes a computer-readable memory medium such as a disk 15 for storing readable data. Besides other programs, disk 15 can store application programs including web browsers by which computer 10 connects to a global computer network, such as the Internet, and the systems described below.

According to one aspect of the present invention, computer 10 can also access removable-media 16 (such as floppy disks, compact flash cards, and the like) for storing data files, application program files, and computer executable process steps embodying the present invention or the like via removable-media 16. Removable-media 16 may comprise a digital versatile disc ("DVD") (not shown), "DVD R/W" (read/write) (not shown), compact disc-read only memory ("CD-ROM") (not shown), rewritable compact disc ("CD R/W") (read/write) device (not shown), and the like. Removable media 16 may be provided with computer 10 to access application program files, stored objects, audio files and data files.

A network interface card ("NIC") (not shown), modem (not shown), integrated services digital network ("ISDN") connection (not shown), or the like also provides computer 10 with a network connection 12 to the local area network ("LAN") as well as the World Wide Web ("WWW"). The network connection 12 allows computer 10 to download data files, application program files, and computer-executable process steps embodying the present invention.

It is noteworthy that the present invention is not limited to the architecture shown in FIG. 1. For example, notebook or laptop computers, handheld devices, set-top boxes or any other system capable of running computer-executable process steps, as described below, may be used to implement the various aspects of the present invention.

Figure 2:
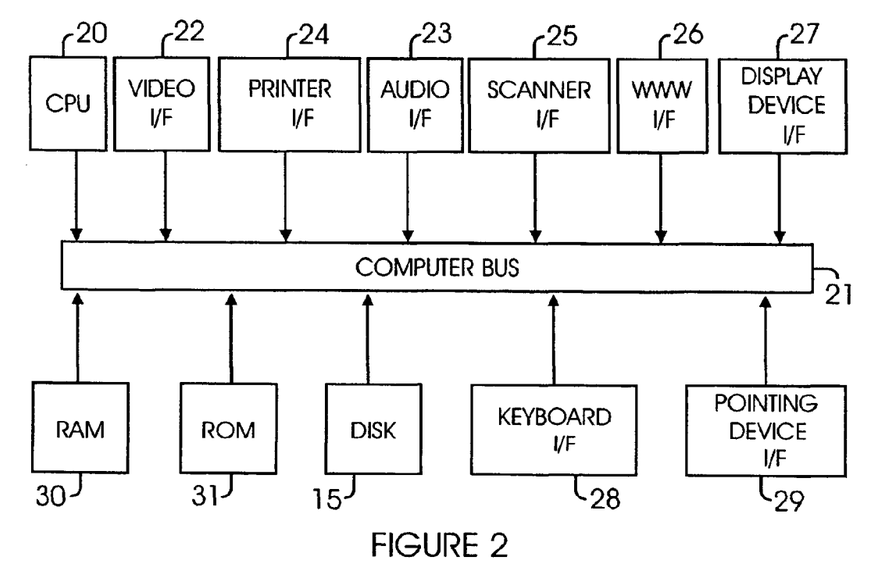
FIG. 2 is a block diagram showing the internal functional architecture of the computing system in FIG. 1.

FIG. 2 is a block diagram showing the internal functional architecture of computer 10. As shown in FIG. 2, computer 10 includes a central processing unit ("CPU") 20 for executing computer-executable process steps and interfaces with a computer bus 21. Also shown in FIG. 2 are a video interface 22, an audio interface 23, a printer interface 24, a scanner interface 25, a WWW interface 26, a display device interface 27, a keyboard interface 28, a pointing device interface 29, and disk 15.

Audio interface 23 processes audio files and video interface 22 allows a user to access video. Printer interface 24 and scanner interface 25 provide computer 10 with connectivity to a scanner (not shown) and printer (not shown).

As described above, disk 15 stores operating system program files, application program files, web browsers, and other files. Some of these files are stored on disk 15 using an installation program. For example, CPU 20 executes computer-executable process steps of an installation program so that CPU 20 can properly execute an application program.

Random access memory ("RAM") 30 also interfaces to computer bus 21 to provide CPU 20 with access to memory storage. When executing stored computer-executable process steps from disk 15 (or other storage media such as floppy disk 16, shown in FIG. 1, or network connection 12, shown in FIG. 1), CPU 20 stores and executes the process steps out of RAM 30.

Read only memory ("ROM") 31 is provided to store invariant instruction sequences such as start-up instruction sequences or basic input/output operating system (BIOS) sequences for operation of keyboard 13 (shown in FIG. 1).

Computer-executable process steps, according to one aspect of the present invention may be performed using the Internet. The following provides a brief description of the Internet.

The Internet connects thousands of computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language ("XML") as published by W3C Consortium, Version 1, Second Edition, October 2000, ©W3C may also be used. The collection of all such publicly available computer files is known as the World Wide Web ("WWW"). The WWW is a multimedia-enabled hypertext system used for navigating the Internet and is made up of millions of web pages with image files, text files, audio files, and video files, which can be accessed electronically as well as displayed on a computer monitor. Each web page can have connections to other pages, which may be located on any computer connected to the Internet.

A typical Internet user uses a client program called a "web browser" to access the Internet. A user can connect to the Internet via a proprietary network, such as America Online® or CompuServe®, or via an Internet Service Provider ("ISP"), e.g., Earthlink®. The web browser may run on any computer connected to the Internet. Currently, various browsers are available of which two browsers are Netscape Browser® and Microsoft Internet Explorer®. The web browser receives and sends requests to a web server and acquires information from the WWW. A web server is a program that, upon receipt of a request, sends the requested data to the requesting user. A standard naming convention known as Uniform Resource Locator ("URL") has been adopted to identify the location of Internet resources. Most files or services can be represented with a URL.

URLs enable web browsers to go directly to any file held on any WWW server. Information from the WWW is accessed using well-known protocols, including the Hypertext Transfer Protocol ("HTTP"), the Wide Area Information Service ("WAIS") and the File Transfer Protocol ("FTP"), and Transmission Control Protocol/Internet Protocol ("TCP/IP"). The transfer format for standard WWW pages is, for example, HTTP.

Figure 3:
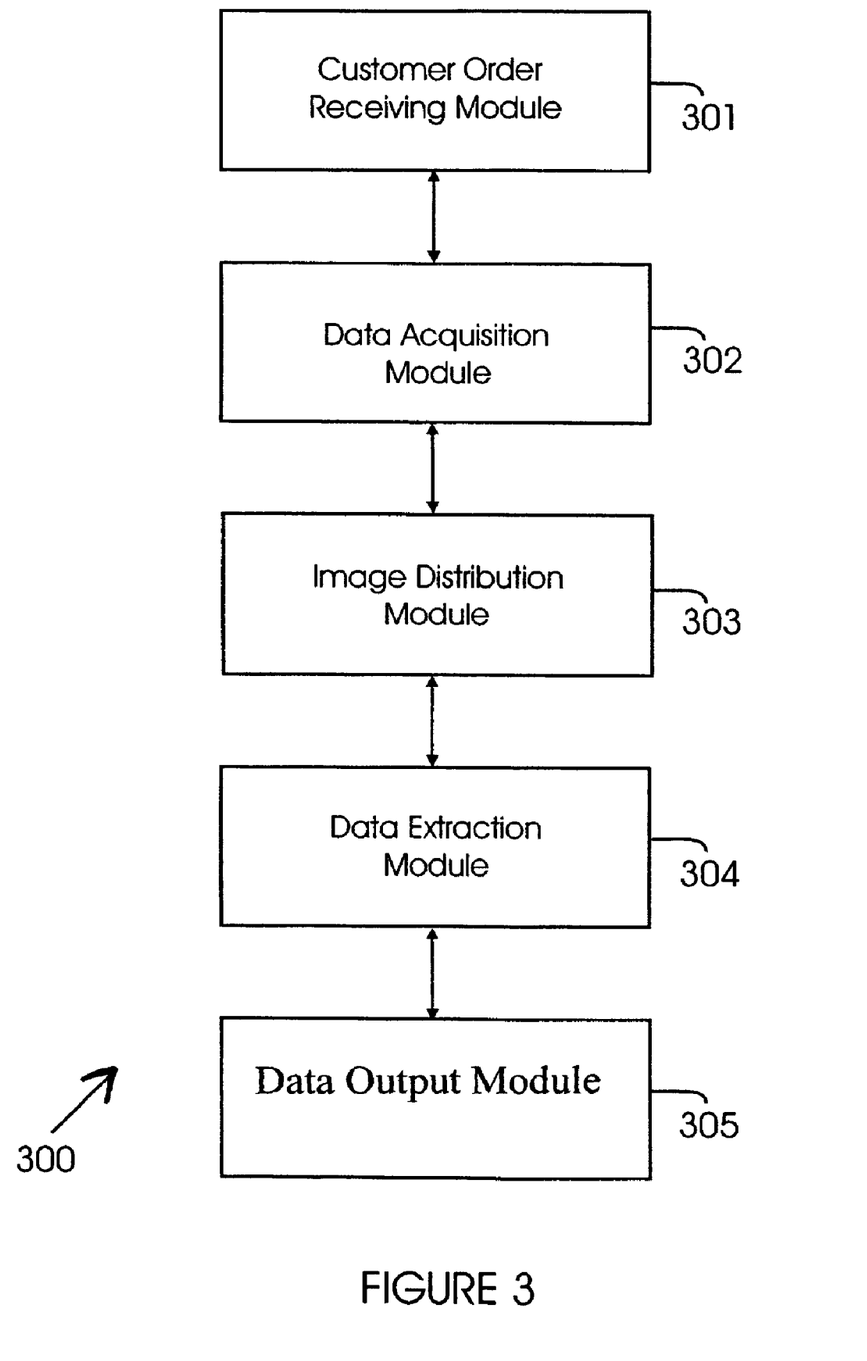
FIG. 3 shows a block diagram of the overall system for processing customer requests, according to one aspect of the present invention.

FIG. 3 shows a block diagram of system 300, for processing customer requests, according to one aspect of the present invention. The various modules in FIG. 3 may be combined into a single module to perform the various adaptive process steps, described below. System 300 includes a receiving module 301 that receives customer requests and a data acquisition module 302 that receives data from plural sources as described below with respect to FIG. 4.

System 300 also includes an image distribution module 303 that distributes data/images to appropriate entities. Data extraction module 304 (also shown as PDE module 501 in FIG. 5B) performs pattern detection and extraction, as described below with respect to FIG. 5A. Data is formatted by data output module 305 and then sent to the appropriate entities.

Figure 6:
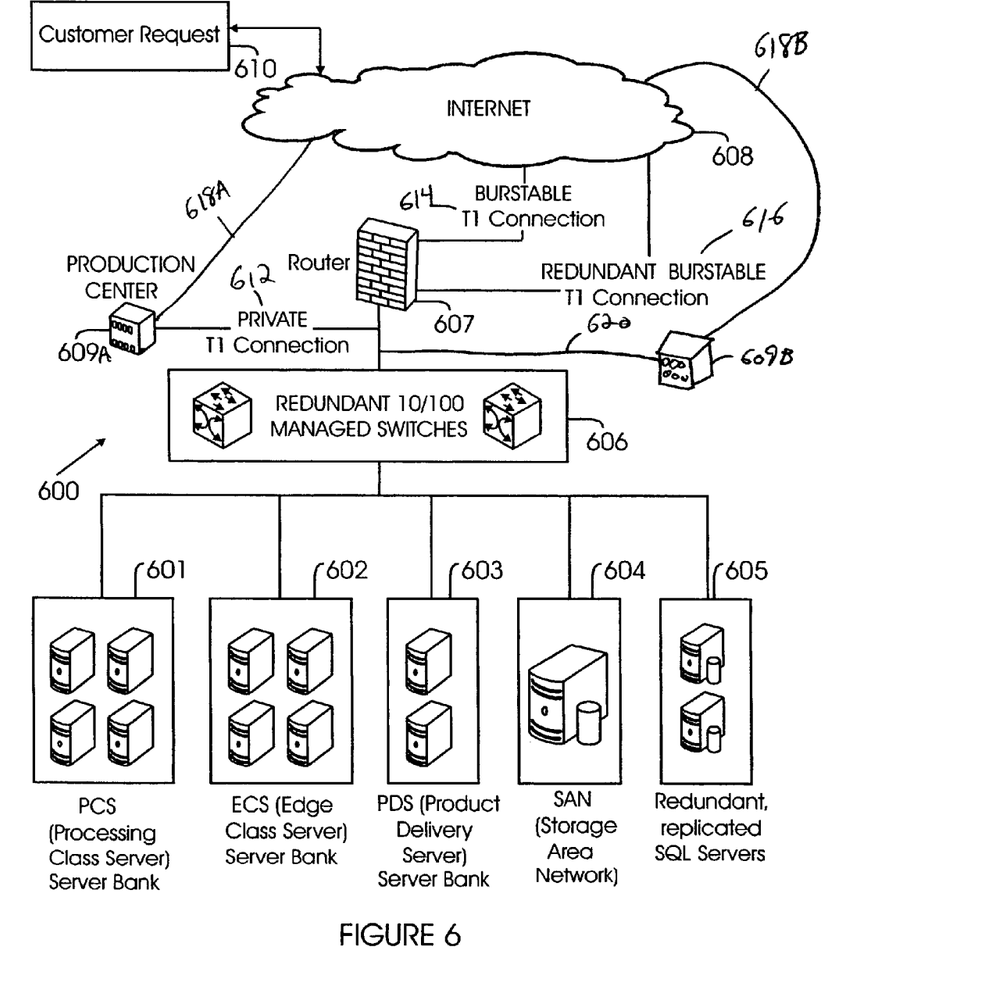
FIG. 6 shows a block diagram of system architecture, according to one aspect of the present invention.

FIG. 6 shows a block diagram of system 600 that executes a customer request 610 received via the Internet 608 (or any other network), according to one aspect of the present invention. System 300 generally uses the overall architecture of system 600, according to one aspect of the present invention.

System 600 includes redundant Internet data centers ("IDC") comprising various class of server banks, including, processing class server ("PCS") bank 601, EDGE class server ("ECS") bank 602, Product Delivery Server ("PDS") bank, Storage Area Network ("SAN") and Storage Communication Servers (SCS) 605, such as a Structured Query Language ("SQL") server. These server banks are coupled to the Internet 608 via redundant switches 606 (for example, redundant 10/100 managed switches) that provide fault tolerance to the various server banks; and through a router 607 (which may have a built-in firewall, not shown, for security reasons).

PCS servers (in server bank 601, shown in FIG. 6) may be used to open and process orders. PCS servers are dedicated to a specific customer or purpose (for example, a title insurance company) and provide adequate security for individual customer data. PCS servers may operate in the Windows® Server 2003 environment and can be load balanced based on traffic.

Production center 609A is coupled to an IDC (601, 602, 603, 604, 605) via private high-speed broadband connection 612 and/or public high-speed broadband burstable connection 614 (such as a T1 connection) connections for review and approval of customer orders. The production center 609A may be connected to the Internet 608 via a circuit 618A, such as a dedicated T1 circuit.

A redundant burstable connection 616 may be used for redundancy. Likewise, another production center 609B may be used for redundancy via a high-speed broadband connection 620. The production center 609B may be connected to the Internet 608 via a circuit 618B, such as a dedicated T1 circuit.

Connections 612, 614, 616, and 620 are not necessarily land-based connections. Instead, connections 612, 614, 616, and 620 (or any connection thereof) may comprise wireless connections.

PCS server bank 601 includes servers that are dedicated to a customer or functionality. Multiple PCS servers may be combined into a single server bank to improve processing power.

ECS server bank 602 is dedicated to perform OCR and PDE functionality, as described below. Each ECS server receives requests and transmits requests using the SCS server bank 605. For example, if a failure in an ECS server E is detected, then PCS server re-routes the request to another ECS server to minimize processing delay.

PDS server bank 603 includes servers that receive product delivery requests from SCS servers 605.

SAN 604 is accessible to all servers and centrally stores all associated requests, results and delivery files.

Figure 4:
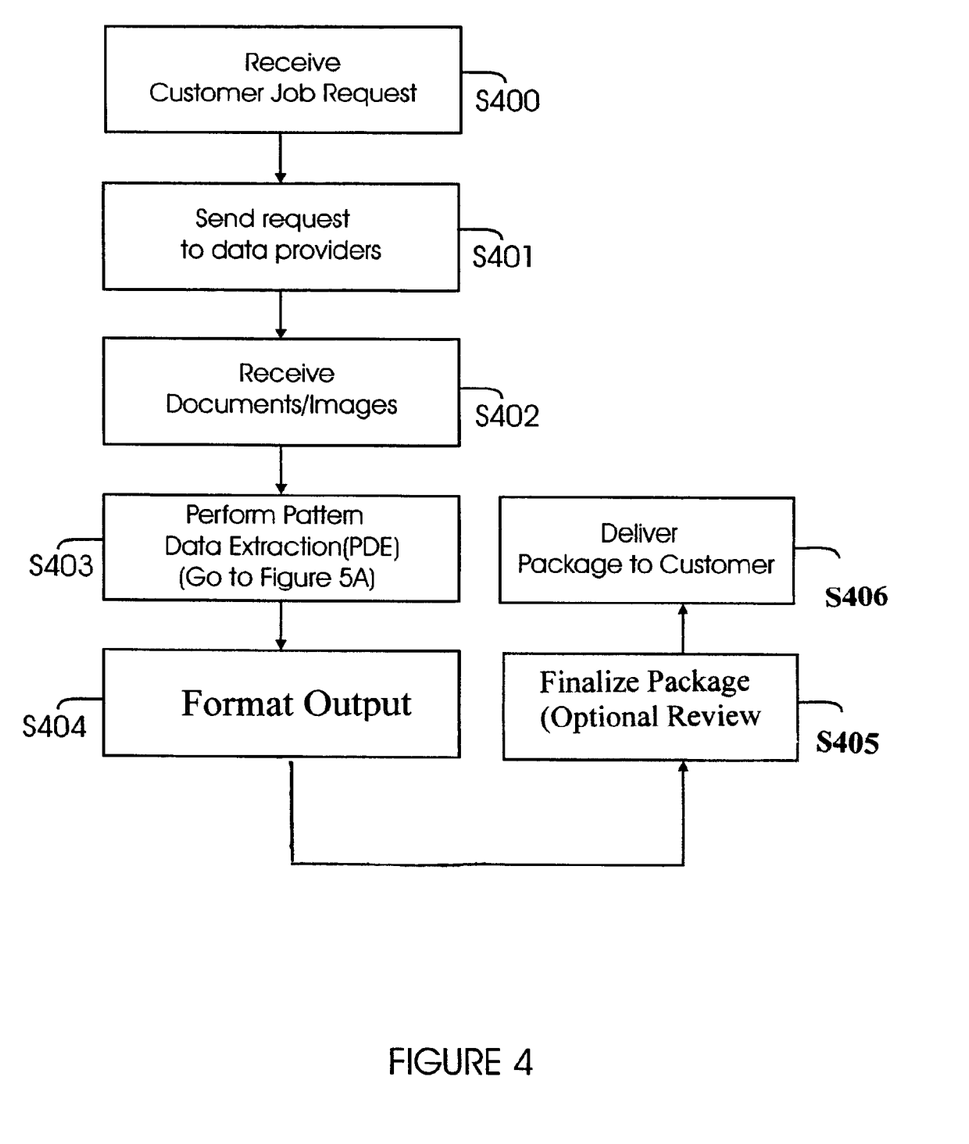
FIG. 4 shows a flow diagram for executing a customer request, according to one aspect of the present invention.

FIG. 4 shows a flow diagram, according to one aspect of the present invention, for processing customer requests, according to one aspect of the present invention. A customer in this context may be an entity that needs custom reports derived from documents and images using system 300 (shown in FIG. 3). The process flow below is to illustrate how a "title" search for real-property transactions may be automated, according to one aspect of the present invention. This is not to limit the adaptive aspects of the present invention. The process steps below may be used to automate any search for business or personal reasons. For example, the process steps may be used for background screening of employees, due diligence searches for mergers and acquisitions; or any other search.

In step S400, a customer order (such as a customer job request) is received and opened. In one aspect of the present invention, orders can be opened using various methods depending on a customer's needs. PCS servers (in server bank 601) may be used to open and process orders. PCS servers are dedicated to a specific customer or purpose (for example, a title insurance company) and provide adequate security for individual customer data. PCS servers may operate in the Windows® Server 2003 environment and can be load balanced based on traffic.

XML based orders may also be received, normalized and then stored in a database (for example, in an SCS database). Order retrieval can be customized based on individual customer requirements. An HTTP post system allows orders to be opened via either a secure (HTTPS) or non-secure (HTTP) method. The HTTP post system can be integrated with a customer's existing web site or a web page can be designed to automatically send an XML request to a PCS server.

Upon receipt of the customer request, multiple data conversion, data parsing and data retrieval operations are used to open the order. Order requests may be processed such that individual customer requirements can be met.

All customer orders are stored in a database on a server, for example, an SCS server. Specific rule sets for each unique customer operation are identified and verified including minimum data requirements, ancillary information lookup, business requirements, underwriting guidelines, and other specifics as identified for each customer.

A confirmation email indicating that the order has been successfully received is sent to members identified in the workflow designated for a customer operation. Customer or other specific requirements can define individual workflow recipients. The confirmation email indicates when the order was received and other specific information related to its expected processing including for example, the title officer name and other elements. The information contained in the confirmation email is defined according to customer requirements.

In step S401, the process initiates data requests that are sent to data providers (not shown). Data providers may include title companies, third party data providers or "title plants", electronic data providers, county recorders, and others. In one aspect of the present invention, the process can operate with a minimal amount of initial data. However, it operates more efficiently with additional information. The process executes an order based on a property address, city, and state. Additional information that may make both the process more efficient and the information retrieved more relevant includes more specific real-property information such as Assessor Parcel Number ("APN") and one or more owner or borrower names. Based on the information supplied, the process creates data requests and directs them to the appropriate data provider.

When an APN is not delivered, system 300 first attempts to identify the specific property and tax assessor information for the customer provided address and buyer/borrower information. In many cases, a primary data provider provides this information. However, in some cases, the primary data provider is unable to identify the property in question from the address alone. When the primary data provider is unable to locate a property in question based on property address, an alternative APN lookup function is activated. This function automatically checks one or more additional data sources to assist in automatically identifying the APN for the property in question.

Once an APN is identified, the system formats and sends a request for a property chain to a primary data provider. Primary data sources are defined for each customer and county. Customer specific access codes and passwords are associated with each data source. When information is unavailable from a primary data provider, the process automatically sends a request to any available alternative data suppliers. Multiple alternative data providers can be defined for each customer.

Property chain information is also formatted and saved to an SCS Server. Property chain information is interpreted according to customer guidelines. Individual customer underwriting guidelines and business rules and logic are used to interpret the information extracted from the chain of title. These requirements relate to the documents required for selection as well as associated timeframes, business rules, and logic that assists in identification of required documents. Guidelines can be defined for individual counties, title officers, and customers as required. Upon receipt of the property chain, it is interpreted according to definitions established for the specific data provider. Individual XML definitions are defined by county, data provider, and customer as required to ensure that the data acquisition process properly identifies and extracts data.

A general index request relating to any recorded documents associated with any of the parties to a real estate transaction is also formatted in step S402, and sent to one or more data providers, wherein document images are received. Individual customer underwriting guidelines, timeframes and business rules are used to determine which general index document images are required for selection. Customer guidelines can be defined for individual counties, title officers, and customers as required.

General index information is formatted and saved to an SCS Server. Upon receipt of the general index, the general index information is interpreted according to customer's guidelines.

A request (for property tax information) is also formatted in step S402 and sent to a tax data provider. Tax information is also formatted and saved to an SCS Server. Tax data is interpreted according to definitions established for a specific county, data provider, and customer. Data not required for processing but related to the property in question, is extracted and used along with all identified tax information to prepare a formatted Tax Sheet that can be included in the delivered product.

In step S402, document images are requested and received from document image providers. Document image providers may include title companies, third party data providers or "title plants", electronic data providers, county recorders or any other source. Primary and alternative document image providers can be defined for each customer. When a document image request fails, the process automatically requests the document image from any available alternative document image providers. Alternative document image providers are defined for each customer and county.

A starter policy is a title insurance policy that may have been in place before the customer order is received in step S400. A request for starter policies is formatted and sent to a primary starter image provider (i.e. a source that can provide the starter policy). Requests are formatted and submitted based on the starter image provider's requirements. Starter request status files are received and interpreted. When a starter request fails, the process automatically requests the starter file from any available alternative starter providers. Alternative starter providers are defined for each customer and county.

Available images are retrieved and stored by a dedicated PCS server that then distributes received documents to available ECS servers in server bank 602. As described above, ECS servers are used for complex and high-end operations, including OCR and the PDE process described above regarding FIG. 6. Received document and starter image files are dispersed to ECS servers (shown in FIG. 6) according to their availability. A single document or starter may be sent to one ECS server. However, a single order can contain multiple documents. In that case, each document may be processed by a different ECS server according to each server's availability. The received images are converted into text files by using standard OCR techniques. The resulting OCR text files are stored on a storage device (not shown). For example; a storage device may be a part of SAN 604. Converted text files may be stored on a central storage device to permit access by all related servers.

Figure 5A:
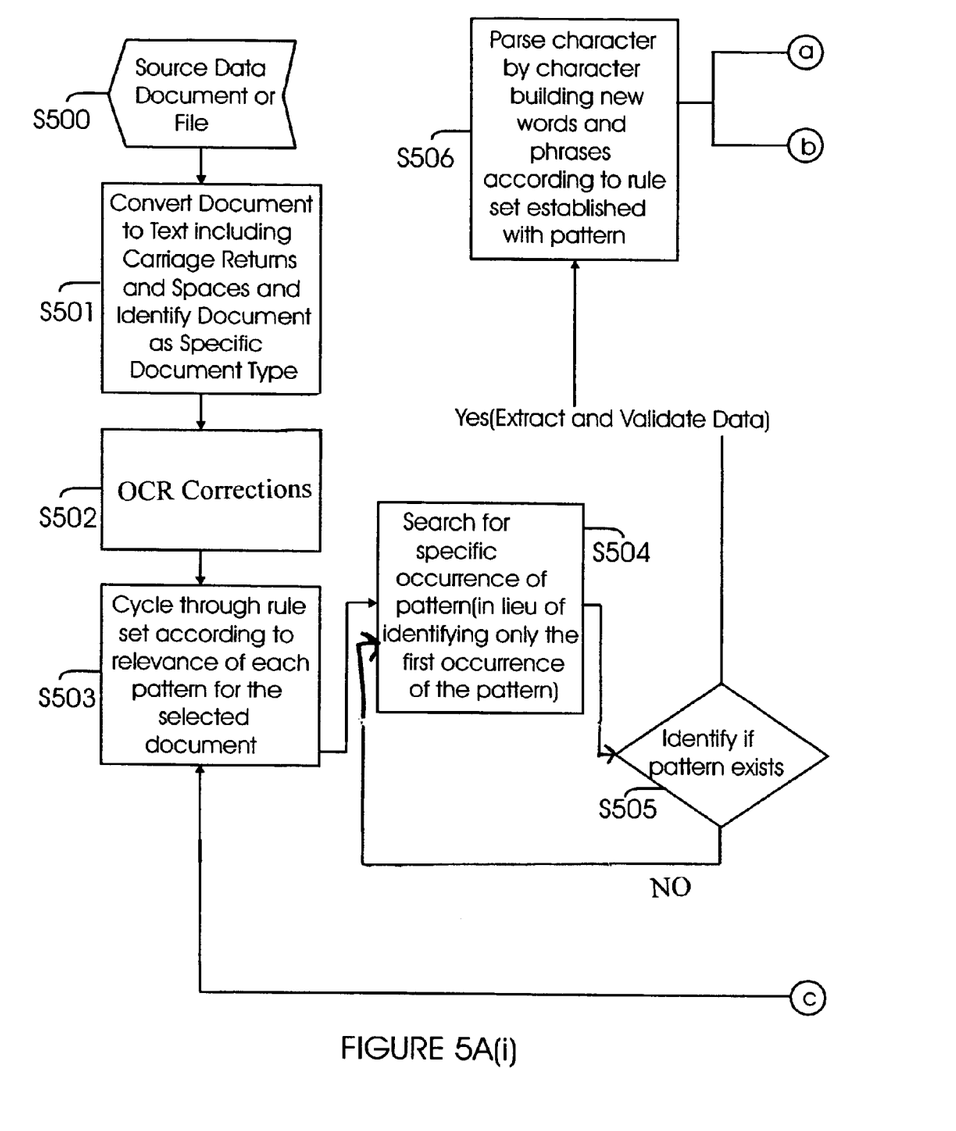
FIG. 5A (FIGS. 5A(i)-(iii)) is a flow diagram of executable process steps for Pattern Detection Extraction ("PDE"), according to one aspect of the present invention.

The OCR files are accessible in step S403. In step S403, the process performs Pattern Data Extraction ("PDE") as described below with respect to FIG. 5 below.

Document images are retrieved in a variety of formats according to the available data providers and their associated capabilities. In step S404, the process prepares a customized report (may also be referred to as a package) for delivery. In one aspect of the present invention, the report files for delivery to customers are converted to the industry standard Portable Document Format ("PDF"). This is to ensure that documents cannot be tampered with. It is noteworthy that other secured document formats may be used for delivery.

Continuing with step S404, PDE information is formatted and saved for each document to a SCS Server. Information related to each document is segregated by document and document type and saved to an SCS server for later review and approval for compilation into the delivered product.

Chain of title and chain documents may also be formatted into a PDF file. Information from the chain of title is originally saved as it relates specifically to the individual owner and property in question. However, the information is saved in a raw data format. In order to present the information to the customer, the data is formatted into a deliverable format with each selected document highlighted. The process also includes hyperlinking to allow the remote retrieval of document images by the customer as required at any time in the future. The remote retrieval of documents is subject to the document image providers available for each customer. The final chain of title and all of the selected documents are formatted as a PDF file using commercially available conversion routines.

The general index for each owner is also formatted to individual PDF files. Information from the general index as it relates to each owner/borrower is saved at the time of retrieval. However, the information is saved in a raw data format. In order to present the information to the customer, the data is formatted into separate sheets for each owner/borrower with each selected document highlighted. The process also includes a hyperlink associated with each document to allow remote retrieval of images by the customer as required at any time in the future. The remote retrieval of document images is subject to the document image providers available for each customer. Separate PDF files are created for each owner/borrower including all of the information from their associated general index and all of the selected documents using commercially available conversion routines.

In step S405, the process advantageously provides for finalizing a customized package based on specific customer requirements. The automated process generates a significant number of images and associated data. The data is automatically processed and accumulated based on a number of proprietary definitions, rules, and algorithms. Once compiled, the prepared package may optionally be made available for a manual review process to ensure that the selected and extracted information and data are correct, before delivery of the package (step S406). Specifically, the documents may be reviewed by a human operator to assure that standards are met and errors are corrected. Any changes made as a result of this review are recorded, and an automated correction process is implemented in the system to correct similar errors automatically.

When an order is subjected to the optional review, it is queued to reviewer workstations and updated to indicate it is now in the review process. When a reviewer's workstation becomes available, the SCS server is queried to identify any non-reviewed orders that require review. The query is based upon the company, the reviewer's knowledge, and their association with the product type and company.

Underwriting guidelines and business processes are combined to generate production requirements. A reviewer's workstation (not shown) identifies the underwriting guidelines and business processes associated with the selected order and presents a "review screen" with the associated information. The reviewer ensures that the information associated with the selected and displayed documents is complete and accurate. A variety of tools are used in the process including spell checkers, help screens, and instant availability of selected documents for review. The workstation may be configured with two monitors allowing changes to the extracted information to be processed on one monitor while viewing the corresponding documents on a second monitor. All changes to extracted data are saved to the SCS server for automated and manual review and adjustments to PDE definitions.

To continually improve and refine the output of PDE and the logic associated with PDE and its various functions, saved changes related to each processed document are automatically interpreted for application to PDE algorithms and functions. When detected, the changes are applied to the PDE definitions ensuring that future orders with similar conditions are processed without any manual intervention. Updates to PDE definitions that are not considered "automatic applications" are queued to a manual application process that allows the condition to be manually reviewed and accepted. The manual review and acceptance procedure helps to reduce erroneous logic from entering the PDE process and definitions.

A reviewer can reject orders if the information associated with the order is found to be inaccurate or if the reviewer determines that the order does not meet the underwriting or business guidelines of the customer. Orders can be reviewed on any number of workstations with no requirement that the workstations by physically close to one another.

In step S407, the process delivers the customized report using production center 609 (shown in FIG. 6). As the review process is completed on each order requiring review, the associated ECS server updates the SCS server with completion information. Each PCS server periodically checks the SCS server to identify orders that are ready for delivery. The PCS server, for completion, processes orders that are ready for delivery The PCS server combines all of the templates and codes producing the delivered product. The PCS server identifies each order along with the associated company and their template, codebook, underwriting, and business guidelines. This information is combined to create the final package.

Templates for each company may be defined and maintained using a What You See Is What You Get ("WYSIWYG") application. A WYSIWYG application is one that enables you to see on the display screen exactly what will appear when the document is printed. The templates include information associated with each product and the data variables, logic functions, fonts, tables, and other formatting requirements. When completed, the templates very closely resemble the current product produced by the title company.

Codebooks for each company include specific phraseology associated with their delivered products. Individual phrases for common conditions that occur related to the property title and general index are included along with their associated formatting, and data elements, and logic requirements. Codebooks make it possible to substitute codes written into templates with customer provided phrases or groups-of-phrases.

Once all associated templates, codes, and data elements are identified, they are combined on PCS servers using proprietary logic that implement the customer's underwriting and business guidelines. The resulting product may be converted into a PDF file using commercially available conversion routines for distribution as required.

PCS servers also combine the delivered product with chain, general index, map, taxes and all related information into a single PDF file, commonly referred to as a Search Package. All documents that were utilized in the creation of the product are included in the a single PDF file This single file (Search Package) provides the Title Company with a single point of reference with all of the materials selected and associated with this title report.

PDS servers (shown in FIG. 6) identify completed products and package them for delivery. The PCS server monitors each of the product preparation functions to determine when the final product is ready for delivery to the customer. Once a completed product is detected, the PCS server routes the product to the PDS server for delivery to the customer via any combination of email, FTP, HTTP, web service, or other form of electronic data interchange.

Delivery notifications are defined according to workflow requirements for each customer, county, and their associated customers. Once the workflow for the order is identified, the PDS server creates an email or other notification according to customer definitions and includes the various files as required and defined by the customer.

An email or other notification based on content defined by the customer can be delivered to the customer and associated workflow participants (such as title officer, real estate broker, lender, and the like) and includes all associated PDF and RTF files. Alternatively, the email or other notification may include only text with links to the files that can be located either on the customer's servers or any remote server.

Associated PDF and Rich Text Format ("RTF") files may also be automatically posted to a customer's secure FTP site with an associated email being sent alerting the customer that files are available.

In addition to posting PDF and RTF files as defined, the individual data elements can be posted to the customer via HTTP post, web service, or other method utilizing XML or other formatting as defined by the customer.

Optionally, the individual data elements can be delivered to the customer as an executable macro file allowing the customer to automatically insert the information directly into their existing processing systems. Information in the macro file is defined according to the customer's processing, system, and business requirements.

Pattern Data Extraction ("PDE"):

In one aspect of the present invention, a process for automatically extracting information from documents is provided. The process combines patterned logic, conditional and exclusion requirements, formatting, and data element definitions to extract data elements from digital documents. For example, PDE can extract the trustor, trustee, mortgagor, mortgagee, and beneficiary names from a deed of trust or mortgage. It can isolate and determine corporate ownership and location ownership information from corporate documents. It can extract amounts and dates from judgments. Wherever a source document or database does not exist, PDE can be utilized against an OCRed image or digital document to extract virtually any data element and prepare the resulting information for integration into a new document, system, or process.

PDE combines various components and algorithms to quickly identify, extract, and return data elements existing in a digital document. The first component utilized is a proprietary algorithm that corrects commonly occurring OCR errors based on document type and word occurrence matching. Following these corrections, rule set dependent logic is employed. This logic is dependent on a rule set containing one or more patterns that are established and maintained for each document type. Utilizing the rule set, PDE can extract an unlimited number of data elements from each document and return the information to a host application for further use in documents, database, or application environments. Once a rule set is established for each document type, the process requires no human interaction or intervention.

Patterns are provided for individual rules that are used to identify and extract data elements from digital document files. Each pattern contains multiple properties, each of which is used to assist in the identification and isolation of complete data elements. While some of the properties are required elements, in its most basic form, a single pattern may contain any or all of the following properties:

Document Type—Identifies the type of document being processed. When rules are applied to a document, the system uses all patterns associated with the document type for isolation and extraction of data. Document types may include "trust deed", "grant deed", "judgment", "UCC" and others as required.

Relevance—Identifies the order in which properties are applied to the document. It is important because it allows PDE to identify the most common patterns to apply for isolating and extracting a given data component first, while applying less common patterns when it is unable to locate the data element utilizing more common patterns.

Pattern—Identifies a pattern to be found in the document text. If this pattern is not found in the document text, this entire pattern is deemed not applicable. An alphanumeric field may be used to isolate the location of a data element. In many cases, this is the title of the field on a form, but may include a zip code, phone number, special character, or any other pattern of characters, symbols or numbers. When combined with Relevance, multiple patterns can be established for a single data component allowing the process to pass the document multiple times in search of a component matching the criteria.

Title—Used to provide a title for a returned data component. The title is used only to return data to a calling application or document.

Variable—Used to name the variable returned to a calling application. The data component isolated and extracted by PDE is returned as the value in the variable.

Ignore Characters—Identifies any characters that should be ignored and removed from any return value for the data component. Multiple characters, numbers, or symbols can be stored in this property allowing the PDE process to skip over characters which are deemed unnecessary for the individual data component. Some characters that are used often in this property include "(", ")", "[", "]", and other symbols.

Exclude—This alphanumeric field identifies any character, word, or phrase that should be excluded from any return value for the data component. This function allows the removal of identifiers such as "Mr.", "Mrs.", and others from values where their inclusion would cause the data to be incorrect.

Type—Identifies the type of data to be isolated. Available types include:

a. Text—Allow the return of any character, number or symbol.
b. Dollar—Allow the return of only numeric data. Remove all spaces identified between numeric values where no symbol exists. Exit extraction process whenever a non-numeric character is identified.
c. Date—Identify return values containing both alpha and numeric characters. Exit extraction process whenever four consecutive numeric values are identified.
d. Value Exists—The data element is found in the document text, though ignored.
e. Numeric—Identify values containing only numbers, exiting when an alphabetic or non-numeric character is encountered.
f. QA Field—The extracted data item is ignored, and a field is presented for manual data input Upper Case Only—Identify and return only values containing upper case characters. Exit the extraction process whenever a lower case character is encountered.

Ignore Returns—When this property is enabled, the PDE process ignores any carriage return encountered while compiling the value for a data element and return a value where the carriage returns have been removed.

Ignore First Return—When this property is enabled, the PDE process ignores only the first character return encountered while compiling the value for a data element and return a value where the first carriage return was removed.

Reverse Search—After a pattern is identified and isolated, the default property is to search forward following the identified pattern. When this property is enabled, the PDE process searches in reverse character order beginning with the first character immediately preceding the identified pattern.

Occurrence—This property identifies which occurrence of the pattern is isolated for extraction of data. In many document types the same pattern may occur multiple times in a document. The occurrence property allows the definition of which specific pattern is required for retrieval of the data. When a negative number is used in the occurrence property, the PDE process begins its search from the end of the document.

Exit On—This property may include any combination of character, numeric, and symbol values. PDE will exit its extraction process whenever this value is encountered in the document.

Required Phrase—Identifies phrases that must exist in the text to be extracted.

Required Variable—Require the Variable exists before extracting the text from the document.

Default Value—When no value is found, this will be displayed in the QA editing screen.

End In Period—When set to Yes, pattern extraction will stop when a period is found after the Pattern.

Do Not End on Spaces—When set to Yes, pattern extraction will not stop on multiple spaces.

Include Condition—When set to Yes, the Pattern is included with the extracted data.

Include Exit On—When set to Yes, the Exit condition is included with the extracted data.

Minimum Length—The required minimum character length of the extracted data

Maximum Length—The maximum character length permitted for the extracted data

Exclude Lower Case Words—Any combination of lower-case words that should be excluded from the extracted data Exclude Starting Characters—Any combination of characters that should be excluded from the beginning of the extracted data End Result When Found—Any combination of characters, symbols or words that when found will cause the extraction to end, but are not included in the extracted data Abort Condition—Any combination of characters, symbols or words that disqualify the extracted data when found after the Pattern Required Characters (OR condition)—Any combination of characters or symbols that must be present in the matched pattern-data Alternative Exit On—Additional Exit On characters, symbols and words that will end the matched extracted data.

Include Alternative Exit On—When set to Yes, the Alternative Exit On is included in the extracted data.

Rules Sets: Rules Sets is a set of plural Patterns contained within a single document type. When rules sets contain multiple Patterns, the PDE process executes each pattern according to its relevance positioning.

Document Sets: This term is given to all the components required to return data elements from a single document or group of documents. The PDE process uses definitions related to each Document Set to identify input files, output mechanisms, and integration requirements. The properties related to each Document Set can either be passed as a parameter by the PDE module 501 (or PDE engine 501) engine, or encapsulated in a database table. Each Document Set is comprised of multiple properties including:

Document Set Identifier—An alphanumeric identifier for a Document Set. This identifier is used by the PDE process to combine multiple document types within the Document Set to produce a single result.

Root Directory—This property identifies the directory location where the files related to a Document Set are located.

Document Type—A character field matching one of the Types available in the PDE engine 501. PDE utilizes the Document Type to isolate all related patterns for data isolation and extraction.

File Names—A list of all the individual file names required to complete a given document type.

Result Type—The type of result to be returned to a calling application including text, XML, and others.

PDE/System Process Flow:

As shown in FIG. 5A, the PDE process can be accessed by any application 500 (FIG. 5B) operating on host computing system 10 (shown in FIGS. 1 and 2) using an application programming interface ("API") 502 located between the application 500 and PDE module 501. As shown in FIG. 5C, the PDE module 501 includes a receiving module 501A that receives documents and images (as in step S402 of FIG. 4) and a processing module 501B that performs the PDE process; and an output module 501C that outputs the results of the PDE process.

FIG. 5A (FIGS. 5A(i), 5A(ii), and 5A(iii)) shows a flow diagram for performing the PDE process according to one aspect of the present invention.

Figure 5B:
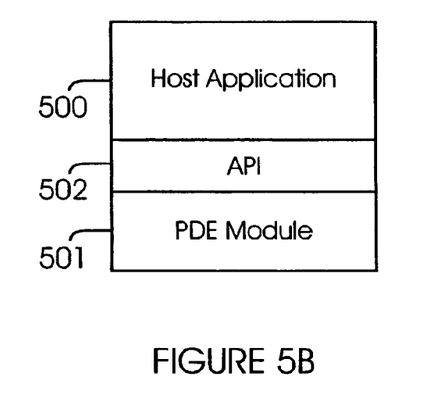
FIG. 5B is a block diagram showing a host application communicating with a PDE module, according to one aspect of the present invention.
Figure 5C:
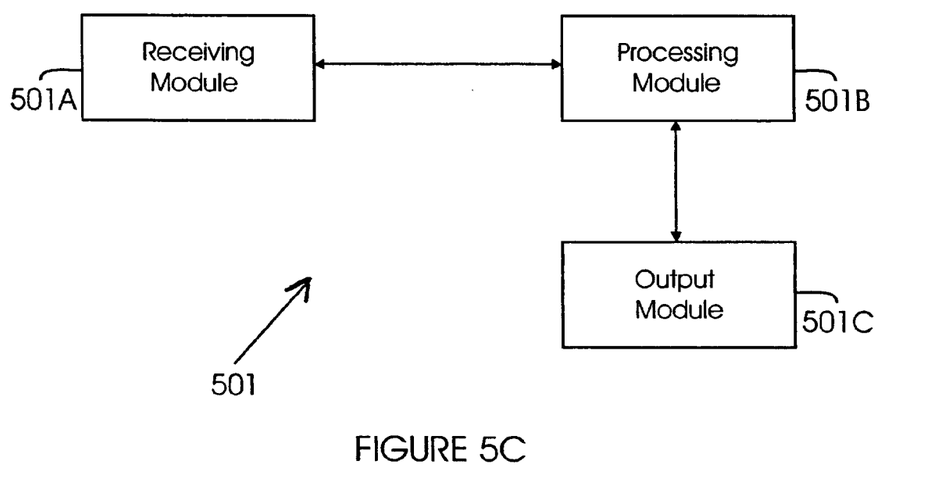
FIG. 5C shows a block diagram of the PDE module, according to one aspect of the present invention.

Turning in detail to FIG. 5A(i), in step S500, a source document or file is received by receiving module 501 (shown in FIGS. 5B and 5C). In step S501, a document is converted to text, including carriage returns and spaces. The Document Type is identified, and the appropriate set or sets are identified for the Document Type.

In step S502, an automated OCR correction step is performed, based on the Document Type. This correction step is advantageously "self-learning," to the extent that feedback is received from any previous quality assurance process, such as the optional manual review process described above in connection with the package finalization step S405. The algorithm that automatically corrects commonly occurring OCR errors based on document type is applied to the converted text.

In step S503, the process cycles through the identified rule set according to the relevance of each pattern for the selected document.

In step S504, the process searches for a specific occurrence of a pattern. If the pattern exists (step S505), then the process moves to step S506, otherwise the process reverts back to step S504.

In step S506, the process parses every character and builds new words and phrases based on the rule set established for the pattern.

As shown in FIG. 5A(ii), step S507 comprises searching the text in reverse from the character position where the pattern was encountered.

In step S508, the text is searched in the forward direction where the pattern was encountered. It is noteworthy that steps S507 and S508 may occur simultaneously.

Based on the search in step S507 and S508, the process in step S509 identifies the data component type and pattern results, based on the rule sets established for the Data Type.

For example, in step S510 ("Dollar Amounts"), numeric characters are identified, extra spacing is parsed out and commas, decimals and other special characters are isolated.

In step S510 ("Dates"), whenever four consecutive numeric values are encountered (exclusive of special characters) the extraction process exits.

In step S512, ("Text/Value Exists") all characters are parsed until any other exit condition is encountered. If a value exists, then the existence of the value is noted.

In step S513, return values containing only numeric characters are identified; exit extraction process when an alpha or non-numeric character is encountered.

In step S513A, the data element extraction is omitted and a field is presented for the manual input of the data element by appropriate personnel.

In step S514, the exit conditions are isolated and the extraction process exits when one such condition is encountered.

For example, the process exits whenever a lower case character is encountered (S515).

In step S516, the process may be configured to exit whenever the following are encountered: a carriage return; (the process may optionally continue despite carriage returns); after ignoring the first carriage return (encountering a second carriage return); or exiting (or not exiting) when a multiple of carriage returns are encountered.

In step S517, the process may be configured to exit when lower case characters, a specific character, symbol, or word is encountered. Step S517 may also comprise: exiting when a specific character, symbol, or word is not encountered in an extracted result; alternate characters, symbols, or words are encountered; when multiple spaces are encountered; when a period is found after a pattern, or other conditions are encountered. Step S517 may also comprise exiting when a specific character, symbol, or word is encountered and is automatically included in the extracted data. Additionally, the extraction process may become abandoned when any combination of abort characters, symbols or words are encountered.

In step S518, the process may exit when a specific exit pattern is encountered.

Data Formatting

In step S519, the process formats the data. This is based on all data elements that are isolated and extracted during the PDE process. A condition of "Exit On" may be configured such that, when set to "Yes," the phrase "Exit On" (or a similar statement) is included in the extracted data. A condition of "Alternative Exit On" may be configured such that, when set to "Yes," the phrase "Alternative Exit On" (or a similar statement) is included in the extracted data.

In step S520, specific conditions, characters, symbols, words, or phrases (identified in the PDE process) may be excluded or removed from the data. Step S520 may also comprise excluding or removing initial characters from a string of data. The exclusion or removal of the characters, symbols, words, or phrases may be case-sensitive.

In step S521, specific conditions, characters, symbols, words, or phrases may be required to be present within formatted data. For example, a phrase may be required to exist in extracted text. A required variable may be mandatory before extracting text. A minimum or maximum character length may be required of extracted data.

In step S522, data formatting is attached to the data. Data formatting may be attached for a date, dollar (or other currency), numeric, and other types of data. Formatting may also be attached for punctuation, ease of reading, or other presentation concerns.

In step S523, the resulting data is returned to host application 500 (shown in FIG. 5B) via output module 501C (shown in FIG. 5C) of PDE module 501. As shown in step S52, the returned data may include title, data element, and a variable name that is defined by host application 500 (shown in FIG. 5B).

In step S525 the process determines if there are more rules. If there are more rules, the process reverts back to step S503, otherwise the process ends in step S526 after data titles, variables, and values are sent to host application 500 (shown in FIG. 5B).

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

The invention claimed is:

1. A method for processing a customer request for an automated title search of a real estate property, comprising:
   (a) receiving the customer request for the automated title search via a computer network;
   (b) creating a job order based on the customer request and using a database to identify a rule set for a customer operation;
   (c) creating a work flow for the customer operation based on customer requirements and the rule set;
   (d) electronically notifying a member designated for the work flow of successful receipt of the customer request;
   (e) sending a document request to a data provider;
   wherein the document request to the data provider includes information from the customer request and any identification information that is derived and associated with the real estate property, including an Assessor Parcel Number and a borrower's identity information; and
   wherein the document request includes a general index request related to any recorded documents associated with any party involved in a transaction involving the real estate property;
   (f) receiving a document image from the data provider in response to the document request;
   wherein the document image includes a starter title insurance policy, if the policy was in place before the customer request was received in step (a);
   (g) performing pattern data extraction on the document image received in step (f) after converting the document image to a text file using an optical character recognition process;
   wherein pattern data extraction is performed based on a defined rule set and is used to obtain a plurality of data elements from the document image, including identity of a trustor, a trustee, a mortgagor, a mortgagee and a beneficiary and the extracted information is automatically integrated into another document;
   (h) automatically generating a customized report after formatting information obtained from the document image and the pattern data extraction; wherein the report is generated based on customer requirements; and
   (i) delivering the customized report based on the pattern data extraction;
   wherein the customized report includes information regarding ownership of the real estate property, a general index, tax information regarding the real estate property and a map showing the real estate property.

2. The method of claim 1, further comprising formatting a chain of title.

3. The method of claim 1, wherein the step of pattern data extraction comprises:
   converting the document image to text;
   identifying an appropriate rule set for a document type; and
   searching for a specific occurrence of a pattern.

4. The method of claim 3, further comprising:
   extracting data from the text;
   identifying a data component type; and
   identifying a pattern result set according to the data component type.

5. A system for processing a customer request for an automated title search of a real estate property, comprising:
   a receiving module for receiving the customer request for the automated title search via a computer network;
   wherein a job order is created based on the received customer request and a database is used to identify a rule set for a customer operation;
   wherein a work flow for the customer operation is created based on customer requirements and the rule set; and
   wherein a designated member for the workflow is electronically notified of successful receipt of the customer request;
   a data acquisition module for receiving data from a plurality of data sources in response to a document request sent to the plurality of data sources, after the customer request is received;
   wherein the document request includes information from the customer request and any identification information that is derived and is associated with the real estate property, including an Assessor Parcel Number and a borrower's identity information; and wherein the document request includes a general index request related to any recorded documents associated with any party involved in a transaction involving the real estate property;

an image distribution module for distributing data to appropriate entities;

a pattern data extraction module for performing pattern detection and extraction;

wherein pattern data extraction is performed after converting the document image to a text file using an optical character recognition process, based on a defined rule set and pattern data extraction is used to obtain a plurality of data elements from the data received from the plurality of sources, including identity of a trustor, a trustee, a mortgagor, a mortgagee and a beneficiary and the extracted information is automatically integrated into another document; and     a data output module for formatting data and automatically generating a customized report after the pattern data extraction; wherein the report is generated based on customer requirements; and includes information regarding ownership of the real estate property, a general index, tax information regarding the real estate property and a map showing the real estate property.

6. The system of claim 5, wherein the pattern data extraction module comprises:

a receiving module for receiving documents and images;

a processing module for performing pattern data extraction; and     an output module for outputting results from pattern data extraction.

7. The system of claim 5, further comprising:

server banks coupled to the Internet via redundant switches.

8. The system of claim 7, wherein the server banks includes a processing class server (PCS) to open and process orders.

9. The system of claim 7, wherein the server banks include a product delivery server (PDS) that receives product delivery requests from SQL servers.

10. A method for pattern data extraction for processing a customer request for an automated title search of a real estate property, comprising:

(a) receiving the customer request for the automated title search via a computer network;

(b) creating a job order based on the customer request and using a database to identify a rule set for a customer operation;

(c) creating a work flow for the customer operation based on customer requirements and the rule set;

(d) electronically notifying a member designated for the work flow of successful receipt of the customer request;

(e) sending a document request to a data provider;

wherein the document request to the data provider includes information from the customer request and any identification information that is derived and is associated with the real estate property, including an Assessor Parcel Number and a borrower's identity information; and wherein the document request includes a general index request related to any recorded documents associated with any party involved in a transaction involving the real estate property;

(f) receiving document source data from the data provider in response to the document request;

(g) converting the document source data into text using an optical character recognition process;

(h) identifying the document as a specific document type;

(i) identifying a rule set for the specific document type;

(j) identifying whether a pattern exists in the document;

(k) cycling through the rule set according to the relevance of each pattern identified in the document;

(l) parsing the document data to build new words and phrases according to the rule set; and     (m) identifying a data component type and pattern results set according to the rule set.

11. The method of claim 10, further comprising:

searching the text in a reverse direction from a character position where a pattern was identified; and searching the text in a forward direction from the character position where a pattern was identified.

12. The method of claim 11, wherein both searching steps occur simultaneously.

13. The method of claim 10, further comprising:

identifying numeric characters;

parsing out extra spacing; and isolating commas and decimals.

14. The method of claim 10, further comprising:

formatting the document data whenever any of the following is encountered:

a lower case character; a specific character, a specific symbol, a specific word, a specific phrase, or a specific pattern.

15. The method of claim 10, further comprising:

formatting the document data whenever a carriage return is encountered.

16. The method of claim 10, further comprising:

formatting the document data whenever a period is encountered after the pattern.

17. The method of claim 10, further comprising:

identifying specific characters, symbols, words, and phrases to be excluded from the document data.

\* \* \* \* \*